United States Patent [19]

O'Connor et al.

[11] 4,294,518

[45] Oct. 13, 1981

[54] DUAL MODE LIGHT VALVE DISPLAY

[75] Inventors: James M. O'Connor, Farmington; George W. Goodrich, Bloomfield Hills, both of Mich.

[73] Assignee: The Bendix Corporation, Southfield, Mich.

[21] Appl. No.: 965,117

[22] Filed: Nov. 30, 1978

[51] Int. Cl.³ .............................................. G02F 1/17
[52] U.S. Cl. ................................. 350/357; 350/335; 350/353; 350/359; 350/362
[58] Field of Search ............... 350/345, 356, 357, 359, 350/362, 353, 338, 267, 335

[56] References Cited

U.S. PATENT DOCUMENTS

| | | | |
|---|---|---|---|
| 1,955,923 | 4/1934 | Land | 350/362 |
| 1,963,496 | 6/1934 | Land | 350/356 |
| 3,512,876 | 5/1970 | Marks | 350/362 |
| 3,743,382 | 7/1973 | Rosenberg | 350/362 |
| 3,799,650 | 3/1974 | Saxe | 350/362 |
| 3,807,832 | 4/1974 | Castellion | 350/357 |
| 3,897,137 | 7/1975 | Dobbins | 350/362 |
| 4,093,356 | 6/1978 | Bigelow | 350/338 |
| 4,104,627 | 8/1978 | Thuler | 350/345 |
| 4,135,790 | 1/1979 | Takahashi et al. | 350/357 |

Primary Examiner—James W. Davie
Attorney, Agent, or Firm—James R. Ignatowski; Russel C. Wells

[57] ABSTRACT

An improved dual mode display optimized for image contrast in both the active and passive modes is described herein. The dual mode display comprises two tandemly disposed light valves in which a semi-transparent reflective surface disposed behind the first light valve display reflects incident light in the passive mode and transmits light from a back illuminating light source in the active mode. The optical density of the electro-responsive material in the first light valve is selected to optimize the image contrast of the image formed by reflected incident light and the optical density of the electro-responsive material of the second light valve cooperates with the electro-responsive material of the first light valve to optimize the contrast of the transmitted image in the active mode of operation.

18 Claims, 3 Drawing Figures

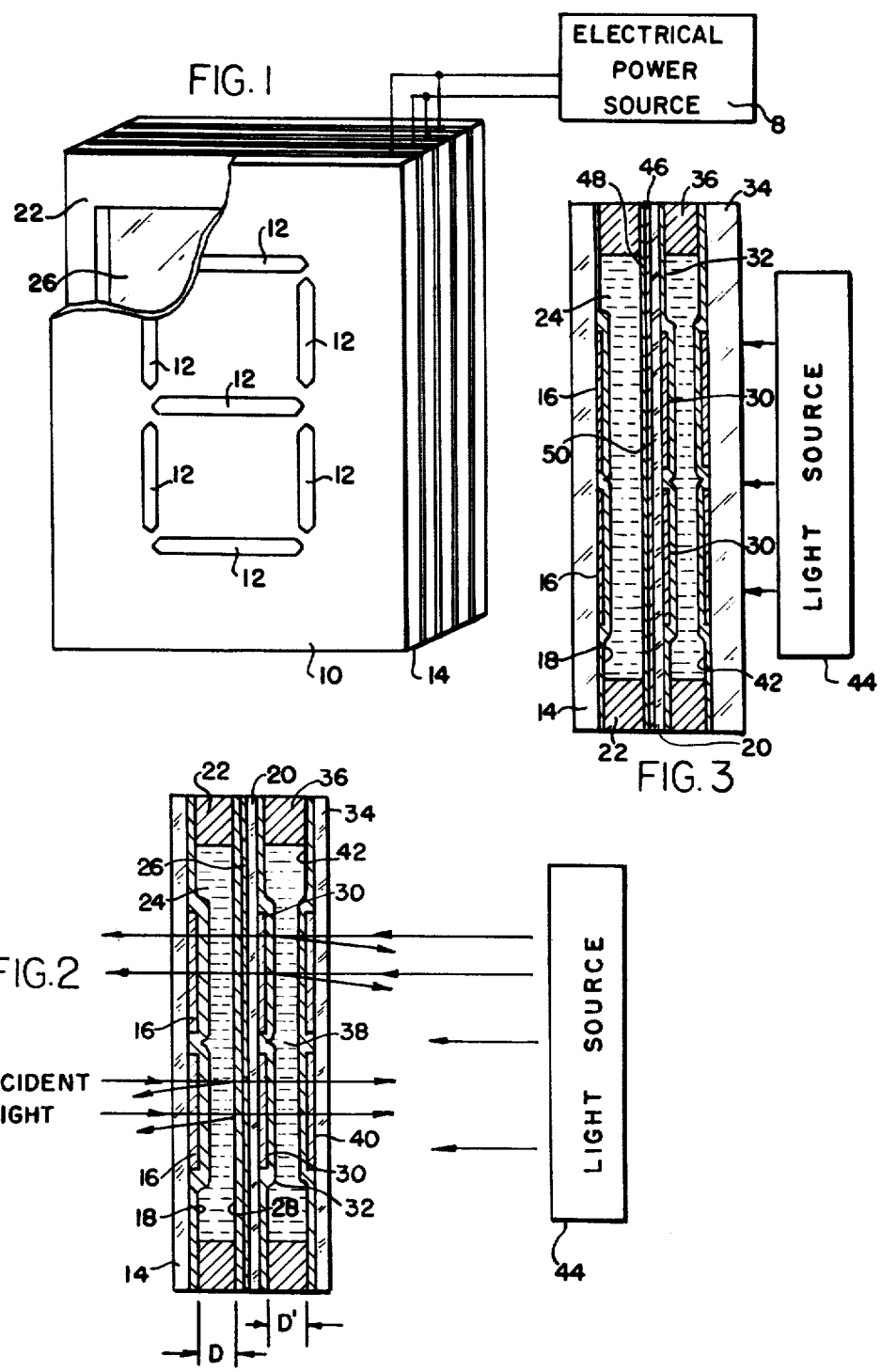

DUAL MODE LIGHT VALVE DISPLAY

CROSS REFERENCE

The disclosed invention is related to the commonly assigned co-pending application Ser. No. 972,138 entitled "A Colloidal Light Valve Having Enhanced Image Contrast," filed on Dec. 21, 1978, now U.S. Pat. No. 4,227,775.

BACKGROUND OF THE INVENTION

1. Field of the Invention

The field of the invention is related to the visual displays and in particular to a dual mode active/passive display.

2. Prior Art

Displays based on the colloidal and electrochromic light valve principal are generally well known in the art. Colloidal light valves as shown by Land in U.S. Pat. Nos. 1,955,923, issued Apr. 23, 1934 and 1,963,496, issued June 19, 1934, embody dichroic dipole particles suspended in a colloid or fluid medium in which the randomly oriented dichroic dipole particles can be caused to align under the influence of electrostatic or electromagnetic fields. The dichroic particles may be reflective or opaque when randomly disposed and transparent when aligned under the influence of an appropriate magnetic or electrostatic field. Electrochromic light valves, such as shown by Castellion in U.S. Pat. No. 3,807,832, issued Apr. 30, 1974 exhibit coloration and bleaching in response to the presence or absence of an electrical field. Although the mechanisms of colloidal and electrochromic light valves are different, their basic functions are equivalent.

Active displays are made by backlighting a colloid or electrochromic light valve. The basic structure of a typical colloidal light valve is shown by Marks in U.S. Pat. No. 3,512,876, issued May 19, 1970. In the unactivated state, the random orientation of the dichroic particles absorb incident light and cause a relatively large transmission loss through the valve. When an AC field is applied across opposing transparent electrodes deposited on the inner surfaces of the substrates, the dichroic dipole particles align along the lines of the field and the colloid suspension becomes transparent. Illumination from a light source behind the light valve passes through the portion of the colloid suspension where the particles are aligned and a light image corresponding to the activated electrode pattern is visible through the front window of the display. Brownian movement of the suspended dichroic particles after the removal of the field will cause the particles to assume their prior light absorbing random orientation.

Passive display panels are made by applying a reflective coating on the inner surface of the rear substrate. This reflective coating may be a mirror surface as taught by Castellion in U.S. Pat. No. 3,807,832, cited above, or may be a reflective surface having a color different from the color of the colloid suspension in the unactivated state. In the unactivated state, the reflective surface is occluded by the dichroic particles and only the color of the dichroic particles is visible when the display is viewed from the same general direction of the incident light. When an AC field is applied across transparent electrodes disposed on the inner surfaces of the substrates, the dichroic particles align with the field and the area underlying the electrodes becomes transparent causing the reflective surface to be illuminated by the incident light producing a visible image at the front face of the display panel.

Active displays work well under relatively low incident light levels but have a tendency to wash out at high light levels, while passive displays work well at high incident light levels but lose visibility under low light levels.

Dual mode displays which are operative in both the active and passive mode are known in the liquid crystal art in which the reflective surface is made from a semitransparent material. In liquid crystal displays, the difference between the optical density of the liquid crystal material in the activated and non-activated state is sufficient to permit high contrast images in both the active and passive modes of operation. In displays using colloidal suspensions of dipole particles or electrochromic materials, the differences in optical density between the activated and non-activated state tends to be somewhat less such that when the optical density of the electro-responsive material is optimized for use in the passive mode, the optical density of the material is insufficient to produce a high contrast image in the active mode and vice versa. This is because in the passive mode, the light passes through the electro-responsive material twice while in the active mode, the light only passes through the material once. Dual mode displays using a single cell light valve in which the optical density of the electro-responsive material is a compromise between the two modes of operation have had less than desirable image contrast.

The disclosed invention is a dual mode display embodying two tandemly arranged light valves in which the optical density of the electro-responsive material in each light valve is selected to optimize the image contrast in both modes of operation.

SUMMARY OF THE INVENTION

The invention is a dual mode display consisting of two tandemly arranged light valves in an integral assembly and a light source illuminating the rear surface thereof. The first of the two light valves has a semitransparent reflective surface disposed behind the electro-responsive medium having an optical density selected to optimize image contrast with the display acting in the passive mode. The electro-responsive film of the second light valve has a higher optical density optimizing the image contrast with the display operating in the active mode. The electro-responsive film may be either a thin film of electrochromic material or a thin layer of a colloidal suspension of dichroic dipole particles as are known in the art.

The object of the invention is an improved dual mode display having a second light valve tandemly disposed behind a first light valve. Another object of the invention is a dual mode display in which the optical density of the electro-responsive medium of the first light valve is selected to optimize the image contrast of the display in the passive mode. Another object of the invention is a dual mode display in which the optical density of the electro-responsive medium of the second light valve is higher than the optical density of the first light valve to optimize the image contrast of the display in the active mode. These and other objects of the invention will become apparent from a reading of the specification in conjunction with the drawings.

BRIEF DESCRIPTION OF THE FIGURES

FIG. 1 is a perspective of the disclosed dual mode display.

FIG. 2 is a cross-section of the dual mode display shown in FIG. 1.

FIG. 3 is an alternate embodiment of the dual mode display.

BRIEF DESCRIPTION OF THE PREFERRED EMBODIMENT

Referring to FIG. 1, there is shown a perspective of the dual mode display capable of forming block alphanumerical characters as indicated by the segments 12 shown in phantom. The details of the dual colloidal display 10 are best explained with reference to the cross-sectional view of the display illustrated in FIG. 2.

Referring to FIGS. 1 and 2, the dual mode display comprises two light valves in tandem relationship. The first light valve comprises a thin front or first window 14. The front window may be transparent or diffusely transparent, such as disclosed in commonly assigned co-pending application, Ser. No. 972,138 filed Dec. 21, 1978 now U.S. Pat. No. 4,227,775 issued Oct. 14, 1980. Application Ser. No. 972,138 is expressly incorporated herein by reference. Deposited on the inner surface of the window 14 are conductive transparent electrodes 16 corresponding to the bar segments 12 of the block alpha-numerical pattern shown in FIG. 1. The electrodes 16 may be a transparent NESA or NESATRON coating deposited in the form of the bar pattern as indicated. The NESA and NESATRON coatings are registered trade names of P.P.G. Industries. A thin non-conductive transparent coating 18 such as an evaporated layer of silicon monoxide is deposited over the electrodes 16. A thin intermediate or second transparent window 20 is disposed a short distance behind the front window 14 and is supported in a parallel relationship thereto by a thin spacer 22. The enclosed volume between the front window 14 and the intermediate window 20 is filled with an electro-responsive material such as a colloidal suspension of dichroic dipole particles 24 or an electrochromic material. A semi-transparent electrically conductive reflective surface 26 is deposited on the front or forward surface of the intermediate window 20. In a manner similar to the non-conductive coating covering the electrodes 16, the semi-transparent surface 26 is overlayed with a thin layer of non-conductive material 28, such as silicon monoxide. The semi-transparent surface 26 may be a vacuum deposited metal such as silver or nichrome or any other metal. To insure the electrical conductivity of the semi-transparent reflective surface, a transparent electrically NESA coating may first be applied to the surface of the intermediate window 20 and the reflective surface 26 deposited over the NESA coating.

The second light valve comprises the intermediate window 20, a rear or third window 34 and intermediate layer of an electro-responsive material 38, such as a thin colloidal suspension of dichroic particles. Conductive transparent electrodes 30 corresponding to the electrode 16 deposited on the inner surface of the front window 14 are deposited on the rear surface of the intermediate window 20. A thin non-conductive transparent layer 32 is also deposited over the electrodes 30. The rear window 34 is disposed behind the intermediate window 20 and is spaced therefrom by means of a thin spacer 36. Conductive NESA electrodes 40 corresponding to electrodes 16 and 30 are deposited on the inner surface of the rear window 34. A thin transparent layer of non-conductive material 32 is deposited over the conductive electrodes 40. The function of the thin layers of transparent non-conductive material 18, 28, 32 and 42 are to protect the underlying electrodes from the corrosive effects of the electro-responsive materials 24 and 38. A light source 44 illuminates the back side of the rear window 34.

The spacings D and D' between the front window 14 and the intermediate window 20 and between the intermediate window 20 and the rear window 34, respectively, are preferably the same so that the activating potentials applied to the opposing sets of electrodes and the semi-transparent surface are identical. To enhance the contrast of the transmitted image, the optical density of the electro-responsive material 38 is comparable to or greater than the optical density of the material 24. Alternatively, the spacing D' may be greater than D to produce the same effect when the optical densities of both electro-responsive materials are the same. This alternative configuration, however, requires that the activating voltage of the second light valve be increased to compensate for the increased spacing D'.

The spacing D and D', the thickness of the electrodes and the reflective surface are greatly exaggerated in the figures for purposes of illustration.

The electrical potentials applied to the electrodes and reflective surface are received from an electrical power source 8. As is well known in the art, electrical power source 8 would be an AC electrical power source when the electro-responsive material is a colloidal suspension of dichroic particles or a DC electrical power source when the electro-responsive material is an electrochromic material. Only one connection is shown to each set of electrodes, however in actual practice, a lead would be provided for each electrode permitting electrical potentials to be applied between selected electrodes to form the desired image or pattern.

Means for making electrical connections to the individual electrodes inside the structure are not shown but may be provided in any manner known in the art.

The operation of the dual mode colloidal display is as follows: Under high incident light levels, the dual mode display operates primarily in the passive mode. The light incident on the front window is transmitted through the electro-responsive material 24 in the areas of the activated electrodes to the semi-transparent reflective surface 26 where a portion of the light is reflected back through the colloidal suspension and back out through the front window. In the passive mode, the light passes through the electro-responsive material 24 twice, therefore, the thickness of the material and its optical density between the randomly oriented and activated states are selected to produce optimum image contrast with incident light. In this mode of operation, the light source located behind the dual mode display is not required but may be activated depending on the particular applications.

Under low incident light levels, the light source 44 behind the display panel is turned on. Light from the light source 44 passes through the rear window 34, through the transparent portion of the electro-responsive material 38 underlying the activated electrodes and a portion passes through the semi-transparent reflective surface 26. The light transmitted by the semi-transparent reflective surface 26 continues to pass through the electro-responsive material 24 in the areas of the activated electrodes 16 and passes through the front window displaying an illuminated image corresponding to the pattern of the activated electrodes. The optical density of the electro-responsive material 38 is selected to optimize the contrast of the transmitted image.

The light source 44 illuminating the rear window of the display may be left on continuously during the operation of the display panel as previously indicated without degrading the operation of either mode. In situations where power consumption must be considered, the light source may be independently turned off when the display panel is operating only in the passive mode.

In the preferred embodiment, the light source 44 produces a diffuse illumination on the rear window, however, when the light source is a point source such as a light bulb, the rear window 34 may be frosted or made from a translucent material to diffusely disperse the incident light producing a more uniformly illuminated image.

In an alternate embodiment shown in FIG. 3, the second or intermediate transparent window 20 is replaced by a translucent window 46. This translucent window may be made from opal glass or a comparable plastic material. A thin electrically conductive NESA or NESATRON layer 48 deposited over the front surface of the translucent window 46 forms the opposing electrode required for the application of the electric field across the electro-responsive material 24. As in the previous embodiment, the NESA or NESATRON may be overlayed with a thin layer of transparent non-conducting material 50 which may be an evaporated layer of silicon monoxide or any other suitable material. The electrodes 30 and the thin transparent non-conductive overlay 32 are applied to the rear surface of the translucent window 46, the same as they are applied to the rear surface of the intermediate window 20 shown in FIG. 2. The operation of the embodiment of FIG. 3 is basically the same as that previously described.

It is not intended that the invention be limited to the embodiments discussed and illustrated. It is well within the capabilities of one skilled in the art to conceive of alternate embodiments of the disclosed dual mode display without departing from the spirit of the invention.

Further, it would be apparent to one skilled in the art to adapt the disclosed concept to displays using electrochromic materials or any other passive displays where the difference in optical density of the electro-responsive material between the activated and non-activated states is limited.

What is claimed is:

1. A dual mode display comprising:
 a front transparent window having a front and a rear surface, said rear surface having a first set of transparent electrically conductive electrodes arranged in a predetermined pattern disposed thereon;
 a rear transparent window disposed parallel to said front window said rear window having a front surface and a rear surface, the front surface of said rear window further having deposited thereon a second set of electrically conductive transparent electrodes corresponding to said first set of electrically conductive transparent electrodes and in registration therewith;
 a semi-transparent reflective substrate disposed intermediate said front and rear windows and parallel thereto, said semi-transparent reflective substrate having an electrically conductive front surface facing said front window, and a rear surface facing said rear window, the rear surface of said semi-transparent substrate having disposed thereon a third set of transparent electrodes corresponding to said first set of transparent electrodes and in registration therewith;
 a first layer of electro-responsive material filling the space between said front window and said semi-transparent substrate, said first layer of electro-responsive material having a first optical density in the absence of an electrostatic field, and a second optical density in response to an electrostatic field applied there across;
 a second layer of electro-responsive material filling the space between said semi-transparent substrate and said rear window, said second layer of electro-responsive material having a third optical density in the absence of an electrostatic field and a fourth optical density in response to an electrostatic field applied thereacross;
 means for sealing said front window, said semi-transparent substrate and said rear window in said parallel relationship; and
 means for individually conducting electrical potentials to said first, second and third sets of electrically conductive transparent electrodes and the electrically conductive front surface of said semi-transparent reflective substrate.

2. The dual mode display of claim 1 further including a light source illuminating the rear surface of said rear window.

3. The dual mode display of claim 2 wherein said light source is a diffuse illuminator diffusely illuminating the rear surface of said second window.

4. The dual mode display of claim 2 wherein said display further includes a diffusely transmissive member disposed between said rear window and said light source.

5. The dual mode display of claim 4 wherein said rear window is said diffusely transmissive member.

6. The dual mode display of claim 1 or 2 further including a source of electrical power operative to simultaneously apply a potential between the individual electrodes of said first set and said conductive front surface of said semi-transparent reflective substrate, and the corresponding individual electrodes of said second and third set of electrodes.

7. The dual mode display of claim 1 or 2 wherein said electro-responsive material is a colloidal suspension of dichroic dipole particles.

8. The dual mode display of claim 1 or 2 wherein said electro-responsive material is an electrochromic material.

9. The dual mode display of claim 1 or 2 wherein said semi-transparent reflective substrate is a thin transparent window having an electrically conductive semi-transparent layer disposed over said front surface.

10. The dual mode display of claim 9 wherein said electrically conductive semi-transparent layer is a vacuum deposited metal film.

11. The dual mode display of claim 1 further including a thin layer of transparent non-conductive material disposed over said first, second, and third sets of electrodes and the electrically conductive surface of said semi-transparent reflective substrate.

12. The dual mode display of claim 1 or 2 wherein said predetermined electrode pattern is a multi-element bar pattern capable of forming block alpha-numerical characters.

13. A dual mode display comprising a first light valve having a first thin layer of electro-responsive material disposed between a front window and an intermediate window, said electro-responsive material operative to change its optical density in response to an applied electrical field;

a first set of transparent electrically conductive electrodes disposed in a predetermined pattern on the inner surface of said front window;

an electrically conductive semi-transparent reflective layer disposed on the inner surface of said intermediate window;

a second light valve having a second thin layer of electro-responsive material disposed between said intermediate window and a rear window, said electro-responsive material operative to change its optical density in response to an applied electrical field;

a second set of transparent electrically conductive material corresponding to said first set of electrodes, disposed in said same predetermined pattern and in registration therewith on the rear surface of said intermediate window;

a third set of transparent electrically conductive electrodes disposed on the inner surface of said rear window in said same predetermined pattern and in registration therewith; and a light source back lighting said display through said rear window.

14. The dual mode display of claim 13 wherein said first layer of electro-responsive material is a thin colloidal suspension of dichroic dipole particles having an optical density optimizing the contrast of the image formed by the reflection of incident light by said semi-transparent reflective layer; and said second layer of electro-responsive material is a thin colloidal suspension of dichroic dipole particles having an optical density optimizing the contrast of the image formed by the transmission of the light from the light source through said first and second light valves.

15. The dual mode display of claim 13 wherein said first layer of electro-responsive material is a thin film of electrochromic material having an optical density selected to optimize the contrast of the image formed by the reflection of incident light by said semi-transparent reflective layer; and said second layer of electro-responsive material is a thin film of electrochromic material having an optical density selected to optimize the contrast of the image formed by the light from the light source transmitted through said first and second light valves.

16. The dual mode display of claim 14 further including a source of electrical power for applying an electrical field between the individual electrodes of said first set and said electrically conductive semi-transparent reflective surface and between the corresponding electrodes of said second and third set.

17. The dual mode display of claim 13 wherein said predetermined pattern is a multi-element bar pattern arranged to form block alpha-numerical characters.

18. The dual mode display of claim 15 further including a source of electrical power for applying a DC electrical field between the individual electrodes of said first set and said electrically conductive semi-transparent reflective surface and between the corresponding electrodes of said second and third set.

* * * * *